United States Patent Office 3,463,761
Patented Aug. 26, 1969

3,463,761
POLYURETHANES OF FLUORINE CONTAINING POLYCARBONATES
Floyd D. Trischler and Jerome Hollander, San Diego, Calif., assignors to Whittaker Corporation, Los Angeles, Calif., a corporation of California
No Drawing. Filed Dec. 30, 1966, Ser. No. 606,027
Int. Cl. C08g 22/10
U.S. Cl. 260—77.5          10 Claims

ABSTRACT OF THE DISCLOSURE

The polyurethane polymer prepared by reacting a hydroxy-terminated carbonate of the formula

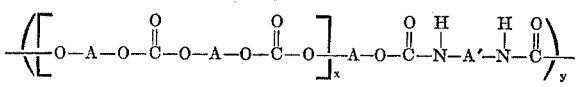

wherein A is selected from the group consisting of

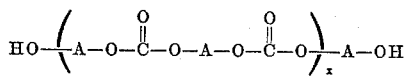

and

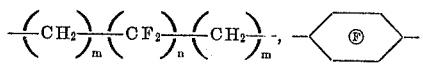

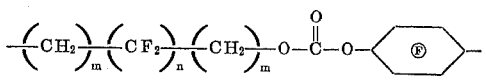

wherein $m$ is an integer from 1 to 5, $n$ is an integer from 1 to 10, and $x$ is an integer from 1 to 500, with an organic diisocyanate of the formula

OSN—A'—NCO wherein A' is a divalent organic group.

---

This invention relates to the preparation of the new and novel polyurethanes of fluorine-containing carbonates.

Polyurethanes have been prepared from polyisocyanates and diols of polyethers, polythioethers, polyesters and the like. However, very few polyurethanes based on hydroxy-terminated polycarbonates have been reported. Of these, none has proven to be particularly suitable for use in applications involving exposure to high temperatures, solvents, or strong chemicals such as oxidizing agents, acids, alkalis, and the like. The present invention is therefore, of particular significance in providing a new class of polyurethanes based on polycarbonates possessing enhanced thermal and chemical properties. These new polymers are structurally unique in having both urethane and carbonate linkages, and containing numerous C—F linkages along the polymer chain.

Thus, it is a primary object of the instant invention to provide a new class of synthetic polyurethane polymers. More specifically, it is an aim and objective of the instant invention to provide a new class of polyurethane polymers characterized by enhanced physical and chemical properties.

Particularly, it is an object of this invention to provide a new class of fluorine-containing polyurethanes based on diisocyanats and polyfluorinated carbonates.

It is also an object hereof to synthesize polyurethanes by a novel process.

These and other objects and advantages of the invention will be apparent from the following more detailed description.

This invention is concerned with the novel polyurethanes having the repeating unit

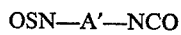

prepared by reacting the hydroxy-terminated carbonate of the formula:

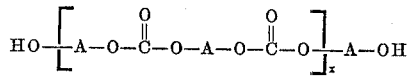

with a diisocyanate of the formula

OCN—A'—NCO wherein A is

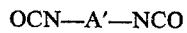

or

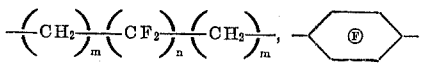

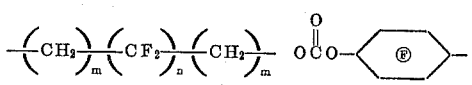

in which $m$ is an integer from 1 to 5 and $n$ is an integer from 1 to 10, A' is a divalent organic group such as an aromatic hydrocarbon group, aliphatic hydrocarbon group, or a halogenated aliphatic or aromatic group, and $x$ and $y$ are integers from 1 to about 500. Normally A' contains 6 to about 12 carbon atoms.

This invention also includes the formation of prepolymers for use as coatings or adhesives. Isocyanate-terminated prepolymers can be prepared by using a greater than stoichiometric amount of diisocyanate. This prepolymer is subsequently advanced with active hydrogen containing compounds such as diamines, diols, dithiols, etc. Hydroxyl-terminated prepolymers can be prepared by using a greater than stoichiometric amount of diol. This prepolymer is subsequently advanced with additional diisocyanate.

The following examples are presented to illustrate the invention. In the examples, the parts and percentages are by weight unless otherwise specified.

EXAMPLE 1

The hydroxyl terminated poly(hexafluoropentamethylenecarbonate) having a molecular weight of 1025 (9.2 g., 0.009 mole), tetrafluoro-p-phenylene diisocyanate (4.0 g., 0.0172 mole) and ethyl acetate (40 ml.) were mixed for 3½ hours at 60°–80° C. The solvent was removed to yield an extremely tough elastomer.

EXAMPLE 2

The hydroxyl terminated poly(hexafluoropentamethylenecarbonate) having a molecular weight of 1550 (12.4 g., 0.008 mole) and tetrafluoro-m-phenylene diisocyanate (1.9 g., 0.008 mole) were heated and stirred at 80°–150° C. over a ½ hour period, followed by a postcure at 105° C. for 2 hours to yield an elastic solid.

EXAMPLE 3

This example is concerned with the preparation of poly[poly(hexafluoropentamethylenecarbonate) tetrachloro-p-phenylene dicarbamate] or the polyurethane of poly-(hexafluoropentamethylenecarbonate) and tetrachloro-p-phenylene diisocyanate, a unique composition of matter. It is prepared directly from the hydroxyl terminated poly-(hexafluoropentamethylene carbonate) and tetrachloro-p-phenylene diisocyanate. The hydroxyl terminated poly-(hexafluoropentamethylenecarbonate) having a molecular weight of 2450 (4.1 g., 0.00167 mole) and tetrachloro-p-phenylene diisocyanate (2.8 g., 0.0127 mole) in ethyl acetate (40 ml.) containing 3 drops of triethylamine catalyst were stirred for 4½ hours at reflux. The solvent was removed and the polymer dried in a vacuum over to yield a light tan elastic polymer having a melting point of 125°–135° C. The infrared date confirmed the identity of this compound.

EXAMPLE 4

This example is concerned with the preparation of poly[poly(hexafluoropentamethylene carbonate) 2,4-tolylene dicarbamate] or the polyurethane of poly(hexafluoropentamethylene carbonate) and 2,4-tolylene diisocyanate, a unique composition of matter. It is prepared directly from the hydroxyl terminated poly(hexafluoropentamethylenecarbonate) and 2,4-tolylene diisocyanate.

A solution of hydroxyl terminated poly(hexafluoropentamethylenecarbonate) having a molecular weight of 1450 (21.7 g., 0.015 mole) and stannous octoate (2 drops) in ethyl acetate (20 ml.) was added to 2,4-tolylene diisocyanate (5.3 g., 0.03 mole) in ethyl acetate (5 ml.) at 70°–80° C. over a minute period with mixing under nitrogen. The solution was mixed for 1 hour at 80° C., then the solvent removed to yield a pale yellow, extremely flexible elastomer. The infrared data confirmed the identity of this compound.

Following the procedure of Example 4, the following two polymers are also obtained:

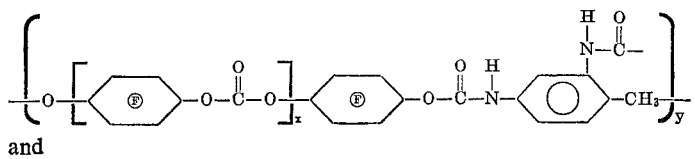

and

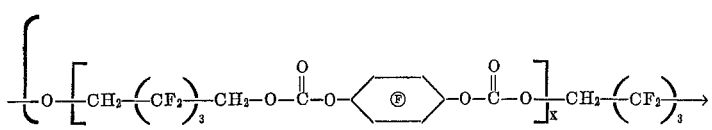

The polymerization may optionally be carried out in the absence of an organic solvent. Certain catalysts such as the trialkylamines and stannic salts of organic monocarboxylic acids may be utilized in small effective amounts on the order of 0.1% to 5.0 by weight of reactants to accelerate the reaction.

The polymers prepared according to this invention have many varied uses. They may be employed in the preparation of tires, inner tubes, belts, hose and tubing, wire and cable jackets, footwear, sponges, coated fabrics, and a wide variety of coated or molded articles. They are characterized by a number of advantageous properties including excellent resistance to heat and cold, direct sunlight, oxygen and ozone, oil and other hydrocarbon solvents. They display unusually outstanding resistance to mechanical abrasion and to deterioration caused by flexing, stretching and the like.

The properties of these polymers may be varied by suitable compounding. The amount and type of compounding agent to be incorporated in the stock is dependent upon the use for which the polymer is intended. The compounding agents ordinarily used in the rubber industry with either natural or synthetic rubber are useful with the products of this invention. These include carbon black, clay, silica, talc, zinc and magnesium oxides, calcium and magnesium carbonate, titanium dioxide, and plasticizers. Inorganic and organic coloring agents may be incorporated to give well defined colors. Conventional rubber processing machinery such as rubber mills or Werner-Pfleiderer or Banbury mixers may be used. The resulting compounded stocks may be shaped and cured in conventional equipment used in the rubber industry.

The solutions or dispersed gels prepared from the uncured polymers of this invention may be used for forming supported or unsupported films, for coating fabrics or solid surfaces, and for forming adhesive bonds between a wide variety of plastics, elastomers, fabrics, metals, wood, leather, ceramics and the like.

The fluorine-containing carbonates of this invention may be obtained by the reaction of phosgene with the appropriate fluorine-containing diols in a manner analogous to the preparation of the well-known hydrocarbon polycarbonates. The carbonate reactants may also be obtained by the interpolymerization of bis-haloformates with diols.

We claim:
1. The polyurethane polymer prepared by reacting a hydroxy-terminated carbonate of the formula

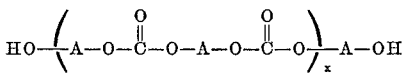

wherein A is selected from the group consisting of

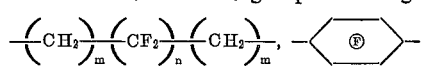

and

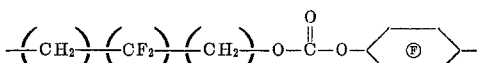

wherein $m$ is an integer from 1 to 5, $n$ is an integer from 1 to 10, and $x$ is an integer from 1 to 500, with an organic diisocyanate of the formula

OCN—A′—NCO where A′ is a divalent organic group.

2. The polyurethane of claim 1 wherein A′ contains from 6 to about 12 carbon atoms.
3. The polyurethane of claim 1 wherein $n$ is one.
4. The polyurethane of claim 1 wherein A′ is selected from the group consisting of aromatic hydrocarbon, aliphatic hydrocarbon, halogenated aliphatic hydrocarbon or halogenated aromatic hydrocarbon.
5. The polyurethane of claim 1 wherein said carbonate is poly-(hexafluoropentamethylene-carbonate) and said diisocyanate is tetrafluoro-p-phenylene diisocyanate.
6. The polyurethane of claim 1 wherein said carbonate is poly-(hexafluoropentamethylene-carbonate) and said diisocyanate is tetrafluoro-m-phenylene diisocyanate.
7. The polyurethane of claim 1 wherein said carbonate is poly-(hexafluoropentamethylene-carbonate) and said dissocyanate is tetrachloro-p-phenylene diisocyanate.
8. The polyurethane of claim 1 wherein said carbonate is poly-(hexafluoropentamethylene-carbonate) and said diisocyanate is 2,4-toluene diisocyanate.
9. The polyurethane of claim 1 wherein an excess of diisocyanate is used to prepare the polymer.
10. The polyurethane of claim 1 wherein an excessive carbonate is used to prepare the polymer.

References Cited
UNITED STATES PATENTS

| | | | |
|---|---|---|---|
| 2,911,390 | 11/1959 | Smith | 260—77.5 |
| 2,864,780 | 12/1958 | Katz et al. | 260—18 |
| 2,929,800 | 3/1960 | Hill | 260—77.5 |
| 3,036,040 | 5/1962 | Lee et al. | 260—47 |
| 3,326,855 | 6/1967 | Matzner et al. | 260—47 |
| 3,234,184 | 2/1966 | McShane et al. | 260—75 |
| 3,304,334 | 2/1967 | Jones | 260—618 |
| 3,330,872 | 7/1967 | Weesner | 260—615 |

DONALD E. CZAJA, Primary Examiner

M. J. WELSH, Assistant Examiner

U.S. Cl. X.R.

117—161; 156—331; 260—2.5, 37, 47